United States Patent [19]

Sadowski

[11] 3,967,036

[45] June 29, 1976

[54] FLUX-COATED ARC WELDING ELECTRODE

[75] Inventor: Edward Peter Sadowski, Ringwood, N.J.

[73] Assignee: The International Nickel Company, Inc., New York, N.Y.

[22] Filed: July 11, 1974

[21] Appl. No.: 487,780

[52] U.S. Cl. .............................. 428/386; 75/123 R; 75/123 J; 75/123 K; 75/123 L; 75/123 M; 75/126 R; 75/126 C; 75/126 D; 75/126 H; 75/128 R; 75/128 B; 75/128 N; 75/128 T; 219/137; 428/385; 428/387
[51] Int. Cl.² ...................... B32B 9/00; B32B 15/18
[58] Field of Search ................... 117/205, 206, 207; 148/24, 26; 427/59, 61; 428/385, 386, 387

[56] References Cited
UNITED STATES PATENTS

| | | | |
|---|---|---|---|
| 2,745,771 | 5/1956 | Pease et al. | 117/205 |
| 2,825,793 | 3/1958 | Kee | 117/205 |
| 3,024,137 | 3/1962 | Witherell | 117/206 |
| 3,107,176 | 10/1963 | Witherell | 117/205 |
| 3,125,470 | 3/1964 | Witherell | 117/205 |
| 3,184,577 | 5/1965 | Witherell | 117/205 |
| 3,211,582 | 10/1965 | Wasserman et al. | 117/205 |
| 3,221,136 | 11/1965 | Freeth et al. | 117/205 |
| 3,378,367 | 4/1968 | Friis et al. | 117/205 |
| 3,560,273 | 2/1971 | Peterson | 117/205 |
| 3,644,144 | 2/1972 | Timofeev et al. | 117/205 |
| 3,767,389 | 10/1973 | Floreen | 117/205 |
| 3,805,016 | 4/1974 | Soejima et al. | 117/205 |

Primary Examiner—Cameron K. Weiffenbach
Attorney, Agent, or Firm—George N. Ziegler; Ewan C. MacQueen; Raymond J. Kenny

[57] ABSTRACT

Nickel-chromium-silicon steel electrode for arc welding provides maraging stainless steel weld deposits having desirable strength, toughness and corrosion resistance in age-hardened condition. Electrode arc can be shielded with inert gas or with lime-cryolite-titania flux containing specially controlled proportions of manganese.

4 Claims, No Drawings

FLUX-COATED ARC WELDING ELECTRODE

The present invention relates to welding and more particularly to welding of stainless steels.

Age-hardenable stainless steels, including maraging stainless steels, have been known and used for many years. Wrought products and castings of age-hardenable stainless steels are available as articles of manufacture for use where corrosion resistance, strength and toughness are required. For instance, maraging stainless steel castings are referred to in U.S. Pat. No. 3,767,389. Capability of welding by machine or by hand operation is often needed in order to utilize desirable properties of age-hardening stainless steels. Yield strength of 130,000 psi and Charpy V-notch impact energy of 30 foot-pounds at room temperature, and corrosion resistance in marine salt-air atmospheres, are among the characteristics desired of welds on age-hardening stainless steel castings. Machine welding and inert gas shielding welding are beneficial for certain needs, particularly where the amount of welding is sufficient to warrant the apparatus expense and the available work-space is sufficient. Yet, there are needs for welding materials that can weld age-hardening stainless steel castings where inert gas shielding is impractical or undesirable, sometimes due to lack of space at the job site or due to the weld location or where only small amounts of welding are needed. More specially, a hand operable welding electrode is needed to make strong, tough, corrosion-resistant welds for joining or repairing age-hardening stainless steel castings. And more generally, there is need for a welding material having versatile use capability for welding a variety of age-hardenable stainless steels, for joining or repairing, by either machine or hand operation, with or without inert gas shielding.

There has now been discovered an arc welding electrode that has good operability characteristics for automatically fed and for hand-fed welding to deposit age-hardenable welds on age-hardenable stainless steel castings.

It is an object of the present invention to provide an arc welding electrode for welding stainless steel castings.

Other objects and advantages of the invention will become apparent from the following description.

The present invention contemplates a welding electrode having a special nickel-chromium-silicon maraging stainless steel composition containing (by weight percent) up to 0.05% carbon, 6.5% to 8.0% nickel, 9.5% to 11.5% chromium, 0.5% to 0.9% silicon, up to 0.5% or possibly up to 1% molybdenum, up to 0.1% manganese, up to 0.1% aluminum, up to 0.1% titanium, up to 0.01% sulfur, up to 0.015% phosphorus and balance essentially iron. Advantageously, for obtaining good mechanical properties in weldments made with the electrode, the total of silicon-plus-molybdenum in the electrode is restricted to not exceed 1.4%. The invention provides bare wire welding materials, e.g., 0.062-inch diameter wire having a clean metallic oxide-free surface, that are satisfactory for machine or hand welding with shielding by inert gas according to MIG or TIG techniques. Moreover, for use where it is desired to have hand operability without inert gas apparatus, such as argon tanks and conduits, the invention provides shielding with a flux having a chemical composition especially adapted for the electrode of the invention.

The flux for the electrode is made with about 21% to 35% calcium carbonate ($CaCO_3$), 20% to 26% cryolite ($Na_3AlF_6$), 21 to 35% titania ($TiO_2$), 3.5% to 7.7% chromium as ferrochromium, e.g., 5% to 11% ferrochrome-70(70% chromium), 2.5% to 5% manganese as ferromanganese, e.g., 3% to 5.8% ferromanganese-85(85% manganese) and, as binders and plasticizers, 2% to 4% bentonite and an addition of potassium or sodium silicate ($K_2SiO_3$ or $Na_2SiO_3$) in a proportion of 13% to 17% of the total weight of the dry materials with a small optional amount of water sufficient for obtaining desired extrudability characteristics. The ferrochromium and ferromanganese can be iron alloy powders containing about 60% to 75% chromium, and about 77% to 90% manganese, respectively.

It is further contemplated that, where desired, a portion or all of the manganese content, referred to before as combined in ferromanganese can be replaced, on a 2-for-1 basis, with about double the amount of manganese in the carbonate form $MnCO_3$, using as a guideline the relationship:

$$(\%Mn\ as\ FeMn) + \tfrac{1}{2}(\%Mn\ as\ MnCO_3) = 2\tfrac{1}{2}\%\ to\ 5\%$$

and further controlling the flux composition to provide that the total of calcium carbonate plus manganese carbonate does not exceed about 44% and the total of titania plus manganese carbonate does not exceed about 42%.

Accordingly, it will be understood that the flux may be referred to as comprising 2 ½% to 5% manganese combined in material selected from the group consisting of ferromanganese, manganese carbonate and mixtures thereof proportioned according to the relationship (%Mn as FeMn+½ (%Mn as $MnCO_3$) equal about 2½% to about 5%. For instance, the flux can be made with 3% or 5.8% ferromanganese-85, or with 11% or 21% manganese carbonate, or with a mixture of 3% ferromanganese-85 and 8% manganese carbonate.

The flux-to-metal ratio, which is the proportion of the flux weight to the electrode metal weight when the flux is in the baked condition, is controlled to be at least 0.3 to one (0.3:1), and should also be controlled to not exceed about 0.4:1, in order to achieve the desired characteristics. The flux in conjunction with the special stainless steel composition for the electrode of the invention provides good characteristics of operability with respect to, inter alia, arc stability, burn-off, weld fluidity, slag fluidity, slag coverage, slag removal, bead appearance and metal transfer in direct-current air-arc welding and enables depositing maraging stainless steel welds that have desired characteristics of corrosion resistance, yield strength of at least 130,000 psi, and Charpy V-notch impact energy of at least 30 ft.-lb., in the age-hardened condition. Along with the other elements in the wire and flux, it is to be particularly observed that manganese is specially controlled to achieve both good operability and good mechanical property characteristics of the weld deposit, e.g., incorporation of manganese into the weld deposit in amounts exceeding 0.85% manganese in the weld deposit is avoided in achieving desired impact resistance of the weld.

In carrying the invention into practice it is advantageous to have the electrode steel contain about 0.7% silicon, about 7.2% nickel and about 10.5% to 11% chromium and to have the flux made with about 30% calcium carbonate, 30% titania, 24% cryolite, 8% ferrochrome-70, 5% ferromanganese-85 and 3% bentonite, plus an addition of 15% potassium silicate. For a production working range it is recommended that the non-metallic flux operating ingredients calcium carbonate, titania and cryolite be maintained within plus or minus 2%. The binder ingredients bentonite and potassium silicate should be in amounts effective for bond strength as needed, e.g., for withstanding handling, shipping and use.

Normally the electrode is made without adding molybdenum and is essentially devoid thereof, e.g., about 0.1% or less molybdenum.

For the purpose of giving those skilled in the art a better understanding and appreciation of the advantages, the following illustrative examples of the invention and results achieved therewith are given.

EXAMPLE I

A nickel-chromium-silicon maraging stainless steel, nominally 7% nickel, 11% chromium, 0.7% silicon, was prepared by vacuum induction melting then, forged and drawn to 5/32-inch diameter wire, and straightened and cut to 14-inch lengths, thereby preparing electrodes referred to hereinafter as El. Chemical analyses of the steel of El was 0.008% carbon, 7.1% nickel, 11.3% chromium, 0.70% silicon, 0.07% manganese, less than 0.02% aluminum, less than 0.02% titanium, 0.005% sulfur, and 0.002% phosphorous. Inasmuch as molybdenum was not added to the melt, molybdenum was practically absent. A welding flux mixture of a composition (Fl) made with about 30% calcium carbonate, 24% cryolite, 30% titania, 5% ferromanganese-85, 8% ferrochromium-70 and 3% bentonite, plus addition of 15% potassium silicate, and tempered with water for extrudability, was extruded as a 0.22-inch diameter coating around the steel electrode and then baked about two hours in air at 550°F. Good operability characteristics of electrodes El were confirmed with direct-current arc welding to make 1-inch thick joint and bead-on-plate welds in the down-hand position in an air atmosphere on cast plates of maraging stainless steel containing about 7% nickel, 12% chromium, and 0.6% silicon. Characteristics of arc stability, burn-off, weld fluidity, slag coverage, slag removal, slag fluidity and bead appearance material were all rated Good. Examination at 30X magnification of slices cut from the weldments showed that good welds, having sound defect-free weld metal fusion-bonded to the base metal, had been deposited and fused by electrodes El. Chemical analyses of the weld deposit from electrode El was 0.018% carbon, 0.38% silicon, 7.41% nickel, 11.6% chromium, 0.62% manganese, 0.01% aluminum, 0.02% titanium, 0.006% sulfur and 0.012% phosphorus. Transverse specimens (WS-1A, B & C), taken from orientations perpendicularly across the weld and including portions of the welded plate, were tested for tensile and impact properties in the 850°F. age-hardened condition obtained by solution treating the weldment one hour at 1900°F., air cooling, and then aging three hours at 850°F. (Where the post-weld cooling approximates the effect of the 1900°F. solution and air-cool treatment, the 850° F. age-hardened condition can be obtained by aging directly from the as-welded condition.) Test results (at room temperature) obtained with specimen WS-1A in the 850°F. age-hardened condition, were: 142,600 psi weldment yield strength at 0.2% offset(YS); 150,000 psi ultimate tensile strength (UTS); 10% elongation (Elong., 1-inch gage) with fracture in casting; and 49% reduction in area (RA). Charpy V-notch impact energy values at room temperature (CVN impact) of specimen WS-1B, taken across the bottom half of the weldment and specimen WS-1C, across the upper half, both notched through the weld, were 36.5 foot-pounds (ft.-lbs.) and 33 ft.-lbs., respectively, in the 850°F. age-hardened condition. The base metal plates were sand castings of a commercially obtained air-induction melted maraging stainless steel B1 having a chemical analysis of 0.018% carbon, 7.1% nickel, 10.9% chromium, 0.72% silicon, 0.08% manganese, 0.1% aluminum, 0.08% titanium, 0.015% sulfur and 0.009% phosphorus. Properties of the unwelded base metal in the 850°F. age-hardened condition were: 137,700 psi YS, 154,800 psi UTS, 13% Elong., 51% RA and 30 ft.-lbs. CVN impact. When higher age-hardening temperatures were applied to the weldment, tensile strength decreased and CVN impact increased, e.g., 131,900 YS and 48 CVN in the 1000°F. age-hardened condition. In further testing of welds made with electrode El, all-weld-metal specimens WS-1D, E and F, which consisted entirely of weld metal, were taken from the length of the 1-inch thick plate joint weld and tested at room temperature in the 850°F. age-hardened condition, and the following results obtained: 137,500 psi YS, 158,600 psi UTS, 18% Elong., 64% RA (WS-1D); 36.5 ft.-lbs. CVN impact (WS-1E from bottom of weld) and 33 ft.-lbs. CVN impact (WS-1F from top of weld).

EXAMPLE II

In another example, ⅛-inch diameter electrodes (E2) of a vacuum induction melted 7Ni/11Cr/0.7Si steel were prepared with a 0.19-inch diameter extruded flux coating and baked about 2 hours at 550°F., providing electrodes E2. Chemical analyses of the core wire was 0.043% carbon, 0.79% silicon, 0.04% manganese 7.5% nickel, 11.1% chromium, 0.075% aluminum, 0.075% titanium, 0.006% sulfur and less than 0.003% phosphorus. The flux mixture was of the F1 composition. The base was of the same composition as the base metal B1 for example I. Bead-on-plate and ⅝-inch thick joint welding on cast maraging stainless steel with electrodes E2 used for down-hand direct-current arc welding by a different operator than in example I showed operability characteristics of arc stability, burn-off, weld fluidity, slag coverage, slag removal, slag fluidity, bead appearance and material transfer that were all rated Good. The resulting welds were found defect-free by inspection of sections at 30X magnification. Chemical analysis of undiluted weld metal from an overlay deposit made with electrode E2 was 0.04% carbon, 0.32% silicon, 0.71% manganese, 7.4% nickel, 12.4% chromium, less than 0.005% each of titanium and aluminum, 0.006% sulfur and 0.017% phosphorus. Results of room temperature testing of a tensile specimen (WS-2A) and of specimens from the bottom portion (WS-2B) and from the top portion (WS-2C) taken across the ⅝-thick plate weld, in the 850°F. age-hardened condition, were: 139,100 psi weldment YS, 159,700 psi UTS, 15% Elong., 51% RA; and 33 ft.-lbs. and 26 ft.-lbs. Charpy impact, respectively. With a 1000°F. age the tensile specimen fractured in the casting; strength was lower, 128,600 psi YS, and impact resistance was higher, 40 ft.-lbs.

For satisfying special needs where it is desired to specially ensure obtaining a particular combination of weldment yield strength and impact resistance of at least 130,000 psi and 30 ft.-lbs., age-hardening at around 925°F., possibly 900°F. to 950°F., is recommended for weldments made with the base metals and electrodes of the foregoing examples I and II.

EXAMPLE III

In another example of the invention, 1-inch thick plates cut from keel-block sand castings of an age-hardenable stainless steel B2, known as CA-6NM, with a chemical analysis containing 0.03% carbon, 0.49% silicon 3.8% nickel, 14.0% chromium, 0.49% manganese, 0.69% molybdenum, 0.005% sulfur and 0.019% phosphorus were V-joint butt welded with 5/32 -inch diameter electrodes having 0.22-inch diameter flux coatings. The electrode steel and flux had the compositions of example I. Operability characteristics and weld deposit characteristics, including freedom from cracking, were good. Results of testing specimens of the weldments in the 700°F. age-hardened condition obtained with a solution treatment of one hour at 1825°F. and air cooling followed with aging two hours at 700°F. showed tensile characteristics of 139,000 psi weldment YS, 163,000 psi UTS, 14% Elong. and 56% RA (two specimen average) with tensile fracture in the weld; and impact resistance of 34.4 ft.-lbs. (four specimen average). Tests of the unwelded cast plates of the CA-6NM steel in the 700°F. age-hardened condition showed tensile characteristics of 132,000 psi YS, 166,000 UTS, 10% Elong. and 32% RA (two specimen average) and impact resistance of 33.2 ft.-lbs. (four specimen average).

Satisfactoriness of flux-coated electrodes of the invention for repair welding of castings is confirmed by the success in making the V-joint and overlay weldments of examples I, II and III.

EXAMPLE IV

V-joint butt weldments joining ¾-inch thick plates of cast maraging stainless steel were made by metal-inert-gas arc welding (MIG or GMAW) with an 0.062-inch diameter bare wire electrode (E3) shielded by argon. The electrode wire was a vacuum-induction melted maraging stainless steel containing 0.021% carbon, 0.78% silicon, 7.6% nickel, 11.5% chromium, 0.05% manganese, 0.040% aluminum, 0.087% titanium, 0.008% sulfur and less than 0.002% phosphorus. Gas content analysis of E3 was 0.4 parts per million (ppm) hydrogen, 41 ppm nitrogen and 48 ppm oxygen and is considered typical of the vacuum-melted electrode steels of the other examples of the invention. V-joint butt welds joining maraging stainless steel plates in the as-cast condition were deposited by the MIG process with electrode E3 automatically machine-fed for arc welding. Operability characteristics, particularly including wire feeding, arc stability, metal fusion and metal transfer, were good. The base metal plates were of a maraging stainless steel composition B3 with a chemical analysis of 0.021% carbon, 7.4% nickel, 11.9% chromium, 1.12% silicon, 0.002% manganese, 0.070% aluminum, 0.080% titanium, 0.012% sulfur and less than 0.01 phosphorus. The gas content analysis of the air-melted base metal B3 was 0.7 ppm hydrogen, 59 ppm nitrogen and 205 ppm oxygen. Weld quality was inspected radiographically and by visual examination of cross-section specimens at magnification up to 30X and found to be excellent, with freedom from cracking or detrimental porosity. Results of room temperature tensile testing of across-the-weld specimens in the 850°F. age-hardened condition were: 147,000 psi weldment YS, 162,000 psi UTS, 19% Elong. and 65% RA; Charpy impact was 49 ft.-lbs. Tensile fracture was in the weld at a yield strength greater than the yield strength of 144,000 psi obtained in a test of the base metal casting in the 850°F. age-hardened condition without welding.

EXAMPLE V

An electrode of the invention served satisfactorily in automatic MIG arc welding to provide a repair weld deposit that filled a groove-shaped cavity in a maraging stainless steel casting. The electrode was 0.062-inch diameter bare wire of the maraging stainless steel composition of electrode E3 of example IV. The casting was of a maraging stainless steel composition containing 0.019% carbon, 6.8% nickel, 11.9% chromium, 0.60% silicon, less than 0.1% manganese, 0.047% aluminun, 0.070% titanium, 0.016% sulfur and less than 0.003% phosphorus. The groove was machined about 6 inches long and 1¼-inch deep, with sides sloping outward from a ⅜-inch radius fillet to an opening width of about 1½-inch at the casting surface. The groove depth was about 50% of the thickness of the casting. The welding was done with the casting in the as-cast condition, without pre-heating, and filled the cavity with sound well-fused metal, without cracking, in a demonstration of weld repair capability of the electrode. Tensile test results from a specimen cut across the weld, tested in the 850°F. age-hardened condition, were: 143,000 psi weldment YS, 159,000 psi UTS, 9% Elong., and 38% RA with fracture in the heat-affected zone of the casting.

EXAMPLE VI

A bare wire electrode of the invention served satisfactorily in automatic MIG arc welding that produced satisfactory V-joint butt weldments joining 1-inch thick plates of the age-hardenable CA-6NM stainless steel referred to as B2 in example III. The electrode was 0.062-inch diameter wire of the maraging stainless steel electrode composition referred to as El in example I. Weld quality was Good. Results of testing specimens cut across the welds and heat treated as in example III were: 141,000 psi weldment YS, 157,000 psi UTS, 15% Elong. and 68% RA (2 specimens average, fractured in weld); and impact resistance of 77.5 ft.-lbs. (4 specimen average).

The electrode wire for the inert-gas shielded welding of examples IV, V and VI was in the condition resulting from hydrogen annealing at about 1900°F. to 1950°F., furnace cooling, followed by vacuum degassing about 12 hours at about 400°F. to 450°F.

EXAMPLE VII

In an illustrative example of the TIG welding, an electric arc is established across a gap between a tungsten electrode and a base metal casting of a maraging stainless steel with a molybdenum-free nominal composition containing 7% nickel, 11% chromium and 0.7% silicon, with 0.1% or less molybdenum, and then a portion of a 0.125-inch diameter bare metal, oxide-free, welding filler wire having a composition containing about 0.02% carbon, 7.2% nickel, 10.5% chromium, 0.7% silicon, less than 0.1% each of manganese, aluminum, and titanium, less than 0.01% each of sulfur and phosphorus and balance essentially iron is fused by the heat of the arc and, while shielded with argon, deposited and solidified in a cavity in the casting with a fusion-bond to the casting and is satisfactory in providing a maraging stainless steel weld repair in the casting.

It is an advantage worth noting that the foregoing examples show electrodes of the invention were successful in depositing crack-free welds on base metals of age-hardenable steels having sulfur contents substantially exceeding 0.01% and up to around 0.015% or 0.016% sulfur. The capability of this success is particularly beneficial where it is undesirably expensive or impractical to restrict the sulfur content of the base metal castings or wrought products to levels below 0.015%. This capability should be exercised with care to avoid having excessive sulfur in the weld deposit where there is transfer of some sulfur from the base metal into the weld deposit. Sulfur content of the resulting weld deposit should not exceed 0.015% and is advantageously maintained lower, e.g., 0.01% or 0.006%, in order to avoid weld metal cracking.

Weldments made with the electrode of the invention on cast maraging stainless steel base plates were exposed in the surface-ground condition to a marine salt-air atmosphere for six months at the 800-foot line from the ocean shore. Inspection after the exposure showed that the corrosion resistance of the weld deposits against the corrosive effects of the marine atmosphere was as good as that of the base metal.

The present invention is applicable in the welding of age-hardenable stainless steels, including maraging stainless steels, and is useful for joining or repairing, or overlaying, castings or wrought products made of such steels. The invention is considered generally applicable for providing age-hardened weldments on age-hardenable stainless steels characterized by age-hardening temperatures of about 700°F. to 1100°F., e.g., stainless steels known as IN-736, IN-833, CA6MN, CA6N and 17-4.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. I claim:

1. A flux-coated arc welding electrode consisting essentially of a metal electrode and a welding flux bonded as a coating on the electrode, said electrode being a maraging stainless steel consisting essentially of up to 0.05% carbon, 6.5% to 8% nickel, 9.5% to 11.5% chromium, 0.5% to 0.9% silicon, up to 1% molybdenum, up to 0.1% manganese, up to 0.1% aluminum, up to 0.1% titanium, up to 0.01% sulfur, up to 0.015% phosphorus and balance iron, said welding flux consisting essentially of the baked residue from a flux mixture consisting essentially of about 21% to 35% calcium carbonate, 20% to 26% cryolite, 21% to 35% titania, 2% to 4% bentonite, 3.5% to 7.7% chromium as ferrochromium, 2½% to 5% manganese combined in material selected from the group consisting of ferromanganese, manganese carbonate and mixtures thereof proportioned according to the relationship (%Mn as FeMn)+½(%Mn as $MNCO_3$) equal about 2½% to about 5%, and with the sum of %$MnCO_3$ plus %$CaCO_3$ not exceeding about 44% and the sum of %$MnCO_3$ plus %$TiO_2$ not exceeding about 42%, and an addition of liquid silicate selected from the group consisting of sodium silicate and potassium silicate and mixtures thereof in an amount effective as a binder, with the proportion of baked flux weight to electrode metal weight being at least 0.3 to one and not exceeding about 0.4 to one, said flux-coated electrode being characterized by capability for providing a weld deposit wherein the manganese content does not exceed 0.85% manganese.

2. A welding electrode and flux as set forth in claim 1 wherein the flux mixture contains 2½% to 5% manganese combined as ferromanganese.

3. A welding electrode and flux as set forth in claim 1 wherein the flux mixture contains 11% to 21% manganese carbonate.

4. A coated electrode as set forth in claim 1 wherein the total silicon-plus-molybdenum content in the maraging stainless steel electrode does not exceed 1.4%.

* * * * *